Figure 1:
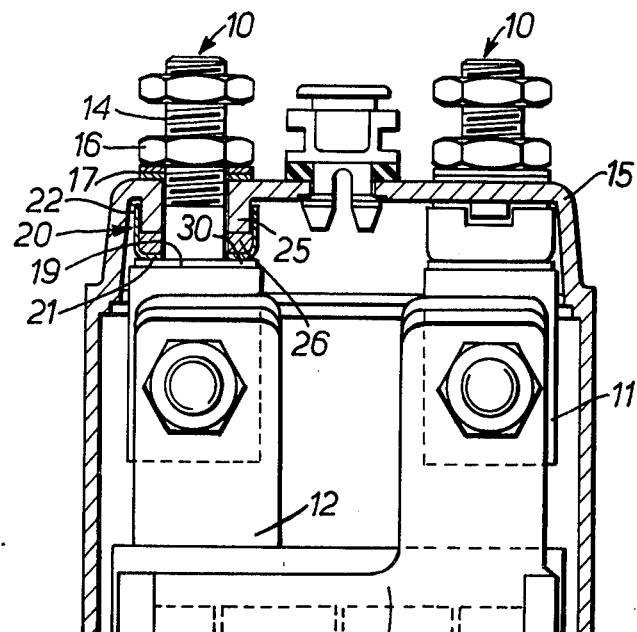

United States Patent [19]

Green

[11] 4,156,756

[45] May 29, 1979

[54] BATTERY TERMINALS

[75] Inventor: Anthony Green, Redditch, England

[73] Assignee: Chloride Group Limited, London, England

[21] Appl. No.: 878,892

[22] Filed: Feb. 17, 1978

[30] Foreign Application Priority Data

Mar. 2, 1977 [GB] United Kingdom ............... 8813/77

[51] Int. Cl.² .................................... H01M 2/30
[52] U.S. Cl. .................................... 429/182; 429/183
[58] Field of Search .................................... 429/182, 183

[56] References Cited

U.S. PATENT DOCUMENTS

| 2,119,967 | 6/1938 | Setzer ............................... 429/182 |
| 2,456,246 | 12/1948 | Berg et al. ............................... 429/183 |
| 3,113,892 | 12/1963 | Albrecht ............................... 429/182 |

FOREIGN PATENT DOCUMENTS

| 525199 | 9/1921 | France ............................... 429/183 |
| 1220987 | 1/1971 | United Kingdom ............... 429/183 |

Primary Examiner—Donald L. Walton
Attorney, Agent, or Firm—Oblon, Fisher, Spivak, McClelland & Maier

[57] ABSTRACT

An electric cell has a terminal post of which one end is of reduced diameter and passes through a hole formed in a wall of the cell and at least a part of which is screw threaded and carries a nut. The terminal post has a shoulder which is drawn by the nut towards the inner side of the wall. Between the shoulder and the wall is a cup washer having a recess which engages a projection carried by the wall. A locking washer is interposed between the cup washer and the shoulder so that rotation of the terminal post is prevented.

8 Claims, 4 Drawing Figures

BATTERY TERMINALS

This invention relates to electric cells, and in particular to terminals for such cells of the type which include a metallic post screw threaded at one end and secured in position through a wall such as the lid of the cell, in association with appropriate washers and gland seals, by means of a nut. Such cells may be individual cells or form part of a larger multicell battery.

When a cell terminal, together with the appropriate washer and gland seal has been assembled with the lid or wall of the cell case, it is necessary to tighten the securing nut firmly to a pre-determined torque value in order to fix the terminal securely in position and to ensure that the gland seal is adequately compressed to prevent leakage of the cell electrolyte. During this operation torque is transmitted to the terminal post which may cause it to twist with consequent distortion of the electrode plates to which the other end of the terminal post is attached. This may result in damage to the plates and in extreme cases short circuiting of the cell.

According to the present invention an electric cell has a terminal post of which one end is of reduced diameter and passes through a hole formed in a wall of the cell and at least a part of which is screw threaded and carries a nut holding the terminal post in position, the terminal post having a shoulder which is drawn by the nut towards the inner side of the wall, and a cup washer between the shoulder and the wall, characterised by engaging projection and recess means afforded by the cup washer and the wall securing the cup washer against rotation, and a locking washer interposed between the cup washer and the shoulder so that rotation of the terminal post is prevented.

Preferably a resilient sealing washer is provided inside the cup washer adjacent the lid to ensure an adequate seal.

The lid may be formed with one or more radial ribs which are engaged by one or more recesses afforded by the cup washer.

Alternatively or in addition the cup washer may be formed with one or more recesses which engage corresponding longitudinal ribs formed on a boss around the inside of the hole in the wall.

The recesses may be provided in the upper edge of the cup washer, or may be formed in a pair of ears carried by the cup washer.

Figure 2:
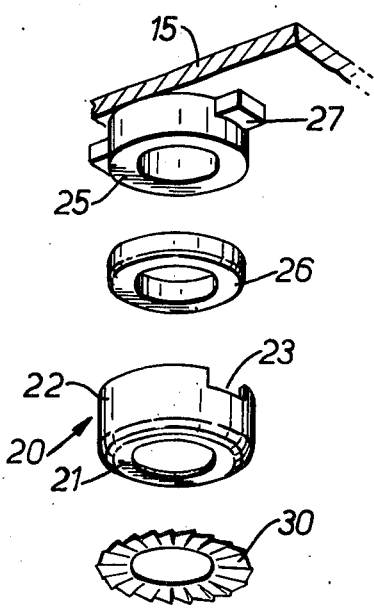
Figure 3:
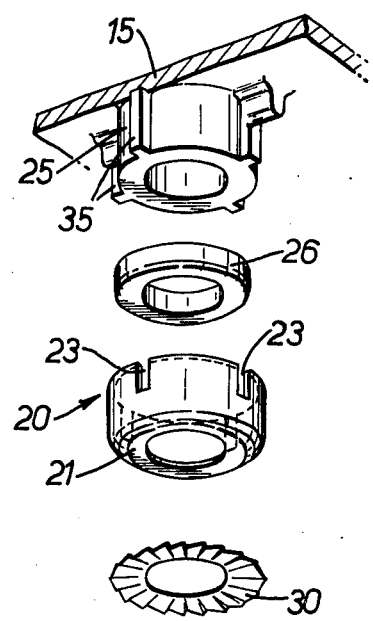
Figure 4:
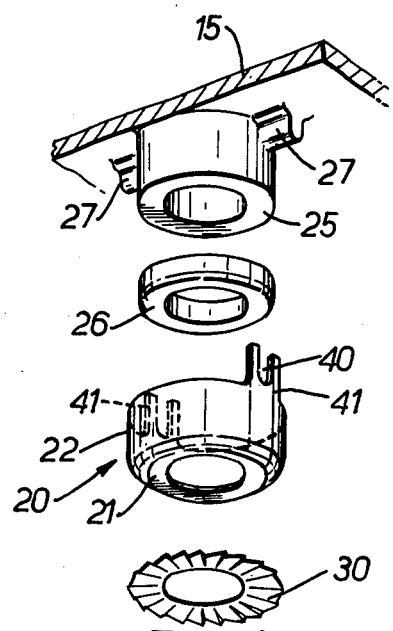

Further features and details of the invention will be apparent from the following description of certain specific embodiments which is given by way of example, with reference to the accompanying drawings in which:

FIG. 1 is a sectional elevation of the upper part of an electric cell of alkaline type having terminals constructed and arranged in accordance with the invention, FIG. 2 is an exploded perspective view of part of the underside of the lid and various washers, and FIGS. 3 and 4 are views similar to FIG. 2 of two modified arrangements.

FIG. 1 shows the upper part of a single alkaline cell having terminal posts 10 whose lower ends 11 are connected to the electrode plates 12 and whose upper ends 14 are of reduced diameter and pass through holes in the cell lid 15. The upper end of each terminal post is screw threaded and carries a nut 16 which forces a washer 17 into contact with the outer surface of the lid.

The terminal post is formed with a shoulder 19 on which sits the flat wall 21 of a cup washer 20 whose cylindrical wall 21 fits around a circular reinforcing boss 25 depending from the periphery of the hole. A sealing washer 26 of resilient material is confined inside the cup washer so that when the nut is tightened this washer is forced into intimate contact with the terminal post, the cup washer and the lower surface of the boss, thus sealing the cell and preventing leakage of electrolyte.

The cup washer is formed in its upper edge with two recesses 23 (seen in FIG. 2) which engage radial ribs 27 formed on the inner surface of the lid thus preventing rotation of the cup washer relative to the lid. A conventional locking washer 30 is provided between the shoulder 19 and the cup washer to prevent relative rotation between these two.

Thus when the nut 16 is tightened during manufacture or subsequent maintenance or when connecting the cell to another, rotation of the cup washer relative to either the terminal post or the lid is prevented. The terminal post is therefore effectively prevented from rotating and possible damage to the plates is avoided.

In a further construction shown in FIG. 3 the boss 25 is formed with two or more longitudinal ribs 35 which engage corresponding recesses formed in the cup washer thus again preventing rotation of the terminal post relative to the cell lid. This construction permits the depth of the cup washer to be reduced and also the use of greater dimensional tolerances since the cup washer can no longer touch the underside of the cell lid.

In a further alternative shown in FIG. 4 the recesses 40 are formed in ears 41 projecting upwards from the remainder of the cupwasher. These are shown as cooperating with radial ribs as in FIG. 1 and 2 but may also be used with longitudinal ribs as in FIG. 3.

What we claim as our invention and desire to secure by Letters Patent is:

1. An electric cell having a terminal post of which one end is of reduced diameter and passes through a hole formed in a wall of said cell and at least a part of which is screw threaded and carries a nut holding said terminal post in position, said terminal post having a shoulder which is drawn by said nut towards the inner side of said wall, a cup washer located between said shoulder and said wall, characterised by engaging projection and recess means afforded by said cup washer and said wall securing said cup washer against rotation and a locking washer interposed between said cup washer and said shoulder so that rotation of said terminal post is prevented.

2. A cell as claimed in claim 1 in which a resilient sealing washer is provided inside said cup washer adjacent said wall to ensure an adequate seal.

3. A cell as claimed in claim 1 or claim 2 in which said wall is formed with at least one radial rib which is engaged by at least one recess afforded by said cup washer.

4. A cell as claimed in claim 1 or claim 2 in which said cup washer is formed with at least one recess which engages a corresponding longitudinal rib formed on a boss disposed around the inside of said hole in said wall.

5. A cell as claimed in claim 3 in which said at least one recess is provided in the upper edge of said cup washer.

6. A cell as claimed in claim 3 in which said at least one recess is formed in a pair of ears carried by said cup washer.

7. A cell as claimed in claim 4 in which said at least one recess is provided in the upper edge of said cup washer.

8. A cell as claimed in claim 4 in which said at least one recess is formed in a pair of ears carried by said cup washer.

* * * * *